Sept. 8, 1959

G. S. KNAPP 2,902,740

DINNERWARE MAKING APPARATUS

Filed Dec. 12, 1955

INVENTOR.
GEORGE S. KNAPP
BY
Brown, Critchlow, Flick & Peckham
His ATTORNEYS

Sept. 8, 1959 G. S. KNAPP 2,902,740
DINNERWARE MAKING APPARATUS
Filed Dec. 12, 1955 7 Sheets-Sheet 2

INVENTOR.
GEORGE S. KNAPP
BY
Brown, Critchlow, Flick & Peckham
HIS ATTORNEYS

Sept. 8, 1959 G. S. KNAPP 2,902,740
DINNERWARE MAKING APPARATUS
Filed Dec. 12, 1955 7 Sheets-Sheet 3

INVENTOR.
GEORGE S. KNAPP
BY
Brown, Critchlow, Flick & Peckham
His ATTORNEYS

INVENTOR.
GEORGE S. KNAPP
BY
HIS ATTORNEYS

Sept. 8, 1959 G. S. KNAPP 2,902,740
DINNERWARE MAKING APPARATUS
Filed Dec. 12, 1955 7 Sheets-Sheet 7

Fig. 12

INVENTOR.
GEORGE S. KNAPP
BY
Brown, Critchlow, Flick & Peckham
HIS ATTORNEYS

United States Patent Office 2,902,740
Patented Sept. 8, 1959

2,902,740
DINNERWARE MAKING APPARATUS

George S. Knapp, Newell, W. Va., assignor to The Homer Laughlin China Company, Newell, W. Va., a corporation of Delaware Application December 12, 1955, Serial No. 552,520

4 Claims. (Cl. 25—22)

This invention relates to apparatus for making ceramic dinnerware, and more particularly to completely automatic apparatus that receives bulk clay and turns out dinnerware.

It is among the objects of this invention to provide automatic dinnerware making apparatus which forms clay into uniform charges that are deposited in correct position in or on molds on a continuous conveyor, which then jiggers and dries the clay, and which removes the dried ware from the molds for further operations, upon it, all without stopping the conveyor.

The preferred embodiment of the invention is illustrated in the accompanying drawings, in which.

Figures 1, 13:
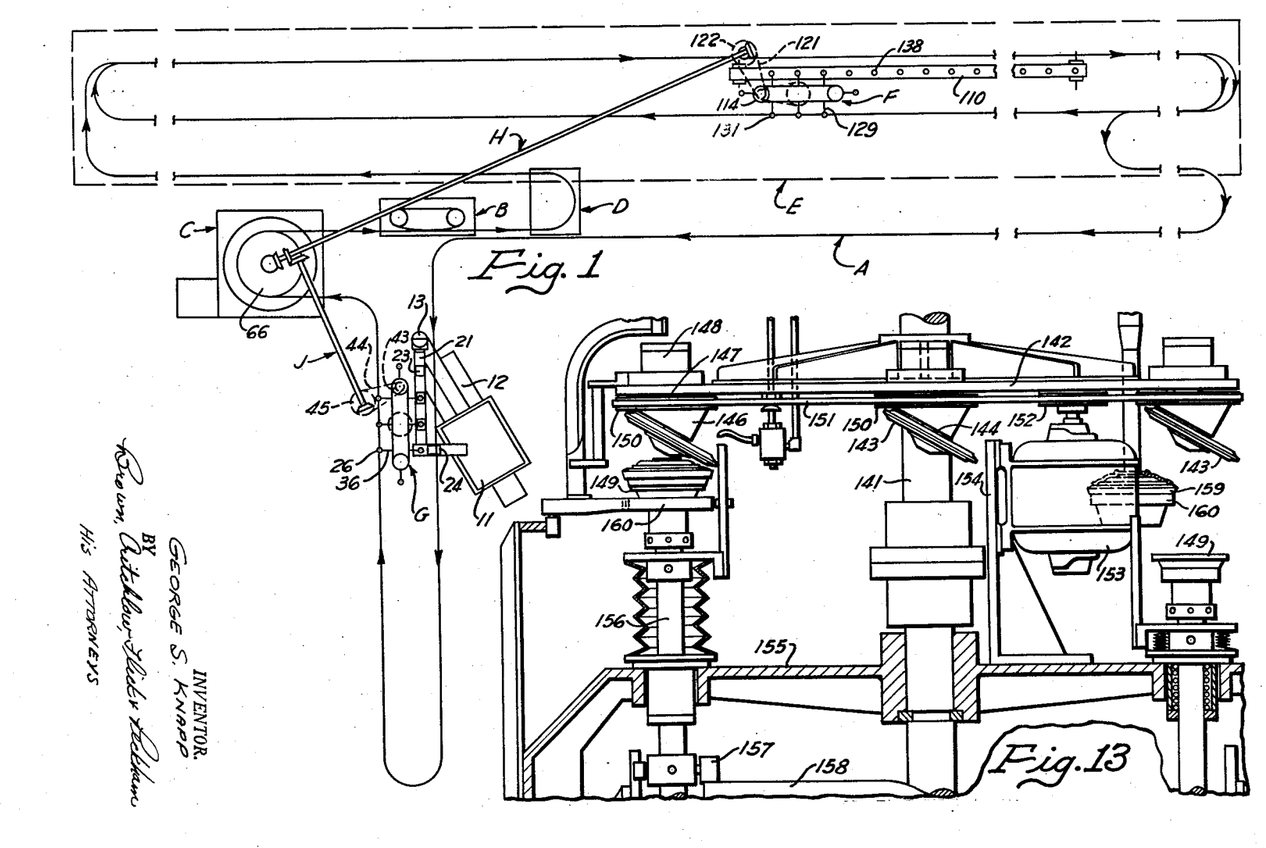
Fig. 1 is a schematic plan view of my apparatus.
Fig. 13 is a view similar to Fig. 5 of a modification.

Referring to Fig. 1 of the drawings, the course of travel of an endless overhead chain conveyor A for molds is indicated by the line with arrows. The chain is driven by a conveyor drive B which pulls it through the jigger C and other machines of the apparatus. As the conveyor chain leaves the drive, it loops through the chain take-up D and then travels up an incline to the top of the drying chamber E. The conveyor travels back and forth in this chamber at progressively lower levels and then down past the mold stripper F, where ware is removed from the molds. From there the conveyor loops around and finally returns to the mold charger G. It will be seen that the chain rotates the top of the jigger, which in turn can drive the mold stripper and charger through long shafts H and J, respectively.

Figure 3:
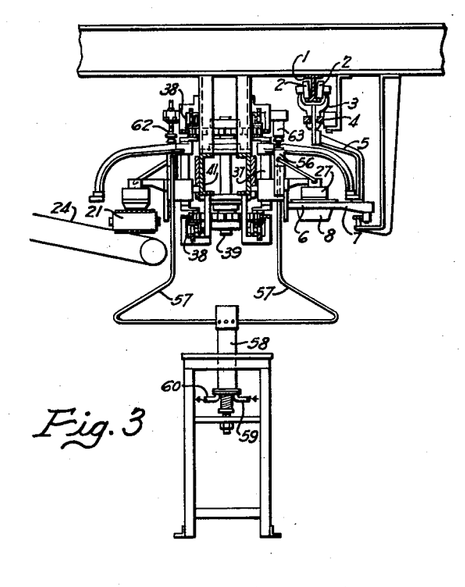
Fig. 3 is a vertical section taken on the line III—III of Fig. 2, but showing a mold receiving a clay charge.
Figure 5:
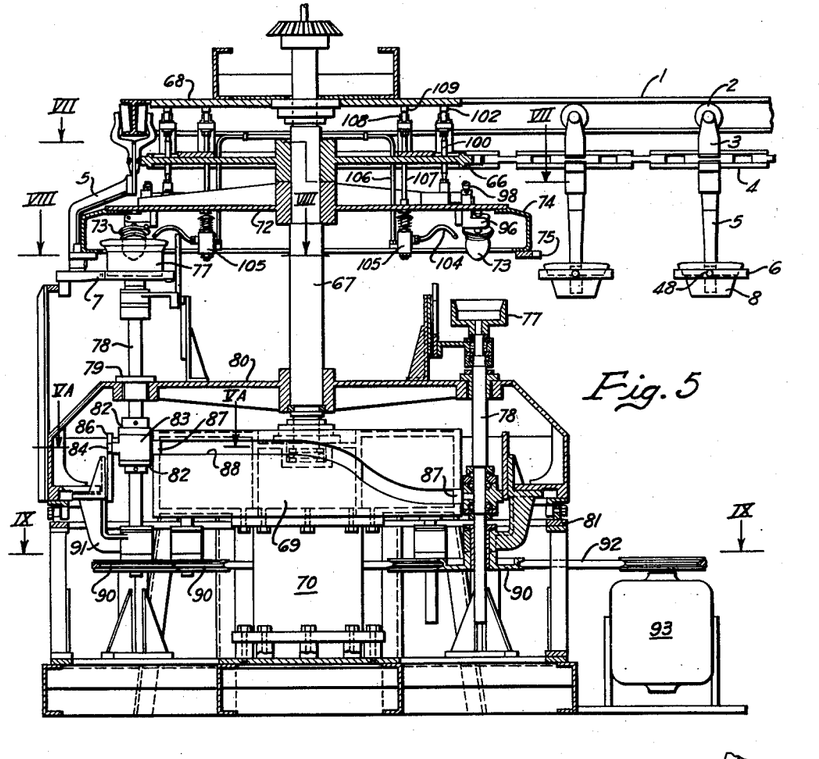
Fig. 5 is a central vertical section through the jigger machine.
Figure 12:
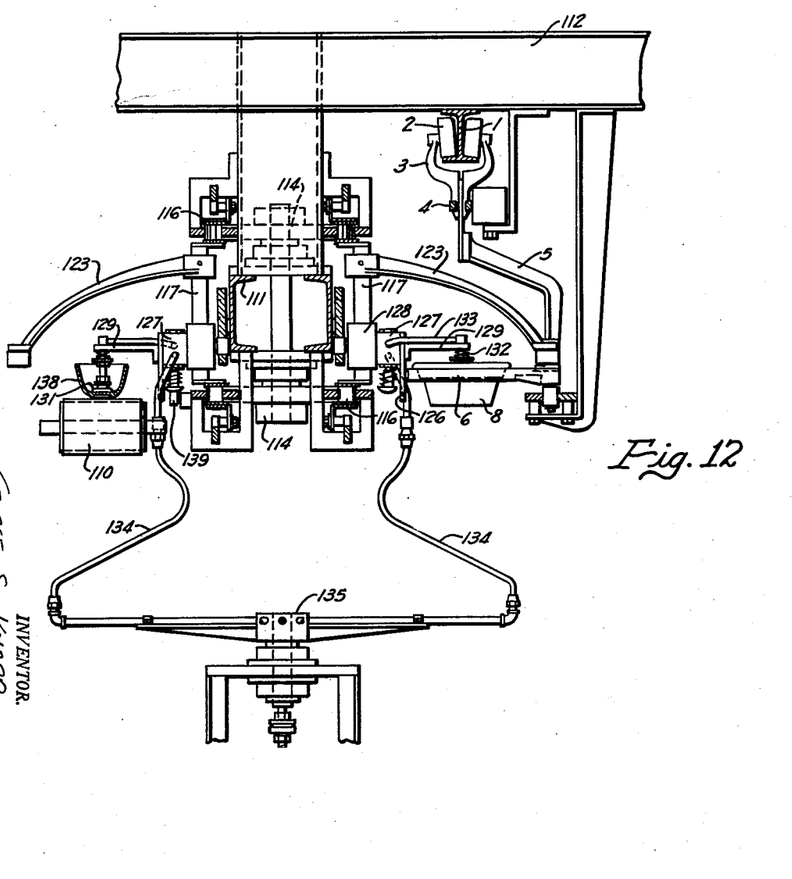
Fig. 12 is a vertical section taken on the line XII—XII of Fig. 10, but showing a mold about to have its cup removed.

The overhead conveyor A consists of three main parts, an endless track, trolleys running on the track, and an endless chain connected to the trolleys for moving them. As shown in Figs. 3, 5 and 12, an I-beam 1 makes a good track and, due to the construction of this conveyor, the track can be curved both horizontally and vertically to suit local conditions and it also can be of any length desired. It is supported from above in any suitable manner. Each trolley has a pair of wheels 2 supported by the lower flanges of the track. The wheels are rotatably mounted in the upper ends of forked members 3, which hang down below the center of the track. Alternate links of the conveyor chain 4 are provided with vertical longitudinal slots, through some of which the trolley forks extend. The side faces of the forks are slotted to receive the links to support the chain. When the chain travels forward, it pulls all of the trolleys along the track with it. Rigidly connected to the lower end of each trolley is the upper end of an arm 5, which extends laterally and then downward. Directly below each trolley is a horizontal ring 6 provided with a radial projection 7 supported by the lower end of the adjoining arm. The rings support molds 8, in or on which dinnerware is formed from ceramic material. For the purpose of illustration, cup molds are shown.

The conveyor drive B is supported beside the conveyor chain in any suitable manner. It is constructed and operates in the same general manner as the conveyor drive shown in Fig. 8 of Patent 2,555,227, and since it forms no particular part of this invention it will not be described here.

The conveyor, carrying empty molds, travels past the mold charger G where cylindrical slugs of clay are deposited in the molds. To feed the charger, clay is dumped into a hopper 11 shown in Figs. 1, 2, and 3, from which augers feed it through horizontal tubes 12 to the lower end of a central vertical tube 13. The clay is forced in a column up through the vertical tube, the upper end of which is provided in its backside with a nozzle 14 having a rectangular slot extending across it. The clay is forced out of this slot in the form of a thick ribbon 15, which is supported by an endless horizontal conveyor belt 21 that travels faster than the ribbon. Mounted above the nozzle is a cutoff mechanism 22 of any suitable construction which cuts the ribbon into square blanks 23 (Fig. 1) as it emerges from the nozzle. The belt is driven enough faster than the ribbon to space the blanks the desired distance apart, which should be equal to the distance between the molds on the conveyor. As each blank approaches the opposite end of the belt, a circular charge or slug is cut out of it and carried away in a manner about to be described. The rest of the blank, which now is scrap, falls off the front end of the belt onto another belt 24 running at right angles to it and is carried back to the hopper so that there is no loss of clay at this point.

Figure 4:
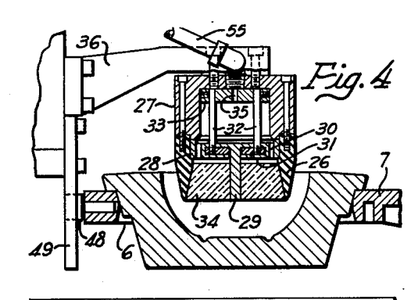
Fig. 4 is an enlarged vertical section through one of the clay cutting devices and the underlying mold.

The device by which a circular slug is cut from a square blank on the belt is a cylindrical cutter shown in central vertical section in Fig. 4. The side wall of the cutter 26 is tapered downwardly in radial section to form a cutting edge and is made of material, such as Teflon, that will not stick to the clay. The cutter is secured to the open bottom of a cylinder 27 that is closed by a stop plate 28 that has a downwardly extending center pin 29 surrounded by vertical passages 30. Slidable vertical on this pin is an ejector 31 that is connected to the lower end of rods 32 extending up through the plate to a piston 33 in the top of the cylinder. When air pressure is applied to the top of the piston through a central hole in the top of the cylinder, it will force the ejector down and thereby push a charge 34 of clay out of the cutter. At the same time some of the air will pass through a central hole 35 in the piston and down through passages 30 to insure separation of the charge from the ejector and pin 29.

Figure 2:
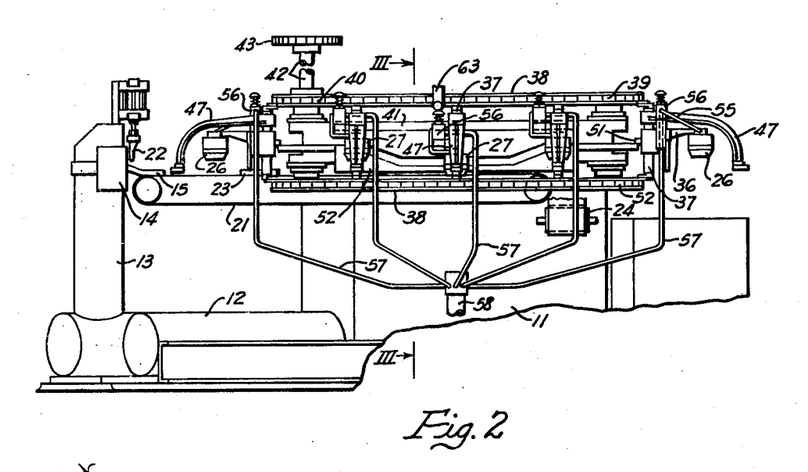
Fig. 2 is a side view of the mold charging machine.

Each of these cutting devices is mounted on the outer end of an arm 36, the inner end of which is splined on a vertical shaft 37 as shown in Figs. 2 and 3. There are several of these shafts supported by upper and lower endless chains 38 which travel around front and rear pairs of sprockets 39 and 40 that are supported by a frame formed from channels 41. The shafts are spaced apart the same distance as the molds on the conveyor. The rear pair of sprockets 40 is driven through a vertical shaft 42 from an upper sprocket 43 that in turn is driven by a chain 44 (Fig. 1) from a sprocket 45 turned by the shaft J that is rotated by the jigger. Thus, the movement of the cutters is synchronized with the operation of the jigger and the travel of the mold conveyor. Rigidly mounted on the upper part of each shaft 37 is a long arm 47 that extends out over the underlying cutter and then down beside it. The lower end of this arm is forked for engaging the lower part of a conveyor arm 5 to thereby hold the mold steady as it moves along at the same speed as the cutter. For the same purpose the mold ring 6 carries a roller 48 that is straddled by a vertical fork 49 when arm 36 descends.

As the cutters are carried around the charger, they move down and up at certain points. This movement is controlled by rollers 51 projecting from the inner ends of cutter arms 36 and traveling on a cam track 52. At the opposite sides of the charger, the tracks are inclined downward to horizontal lower levels. This causes the cutters to move down toward belt 21, and the timing is such that each descending cutter will be pressed down into a clay blank 23 carried by the belt. As the cutter cuts through the clay, suction is applied above piston 33, which is thereby drawn upward. The suction, acting through piston hole 35 and stop plate passages 30, helps hold the slug 34 up in the cutter. The cutter then moves up the inclined cam track with the slug of clay in it and carries it around to the opposite side of the charger, where the cutter again moves down. This time, as shown in Fig. 4, the cutter descends into a mold that is carried along beside the charger, and the clay in the cutter is discharged into the mold by means of the ejector 31 and air pressure. The cutter then rises out of the mold and passes around the end of the charger to repeat the cycle. In this way, each mold receives a charge of clay of a predetermined size and shape, which is deposited in the mold in a predetermined location. All molds are charged exactly alike. The hole made in the center of each charge by pin 29 forms a vent that prevents air from being trapped beneath the charge in the mold.

To apply air pressure and suction to the cutter cylinders 27, each cylinder is connected by a hose 55 to a normally closed valve 56 carried by the adjoining arm 36. As shown in Fig. 3, each valve is connected by a hose 57 to the upper part of a rotating distributor 58 that is provided with internal vertical passages, the lower ends of which move alternately into communication with pipes 59 and 60. Pipe 59 is connected with a source of air pressure, and pipe 60 with a vacuum pump (not shown). As soon as a clay cutter cuts through a blank on belt 21, the valve 56 associated with the cutter is opened momentarily by an actuator 62 that is moved down automatically in any suitable manner, such as by fluid pressure. Since the valve has just been put into communication with suction pipe 60, the air pressure in the cutter cylinder is reduced and the clay charge is held securely in place. After the cutter and charge travel around to the opposite side of the machine and descend into a mold, the valve 56 is again opened, this time by a stationary cam 63. The valve being connected with air pressure pipe 59 at this time, the piston is forced down in the cutter cylinder, and the ejector 31 pushes the clay slug down into the mold. Shortly thereafter, the empty cutter rises again and passes around the rear end of the machine to repeat the cycle. Each cutter goes through the same cycle of first cutting out a slug of clay, picking it up and then depositing it in the center of a mold.

Figures 7, 8, 9:
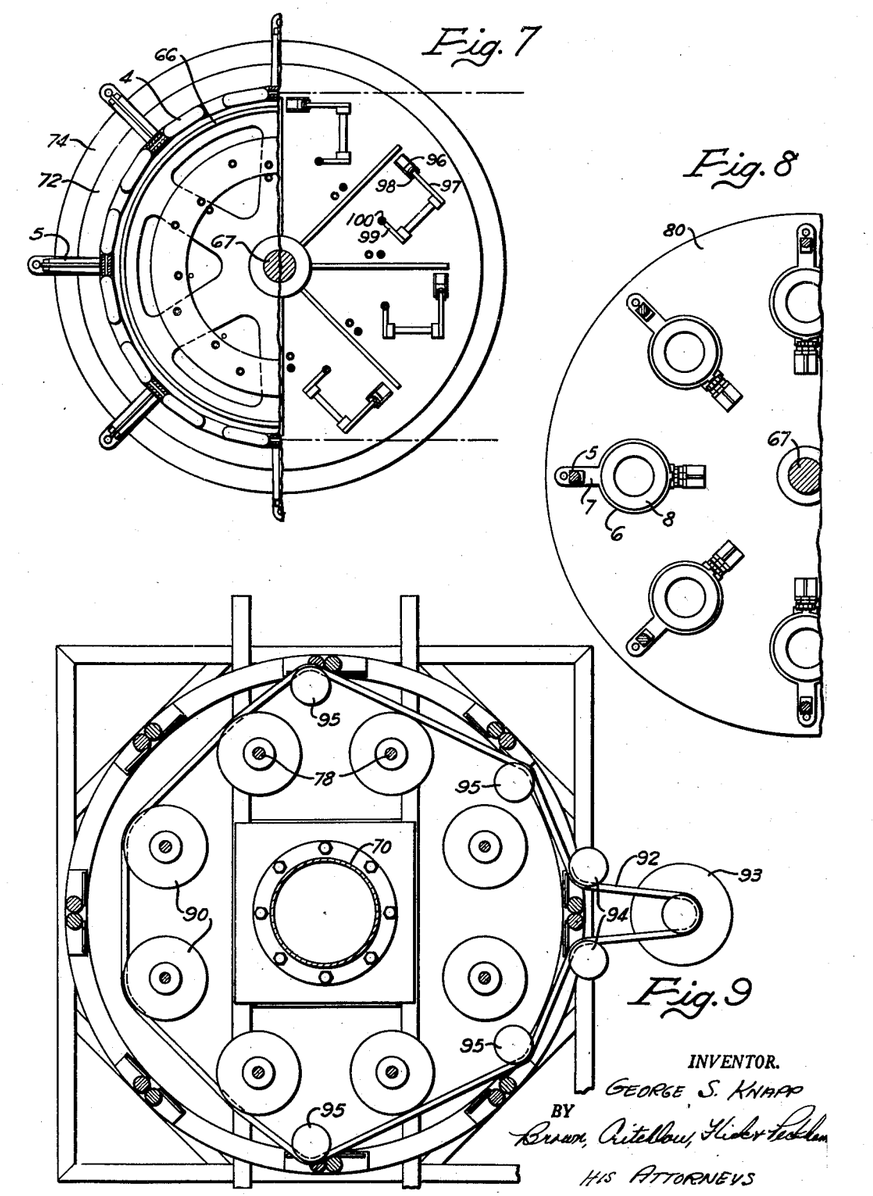
Figs. 7, 8 and 9 are horizontal sections through the jigger machine, taken on the lines VII—VII, VIII—VIII, and IX—IX, respectively, of Fig. 5.
Figure 10:
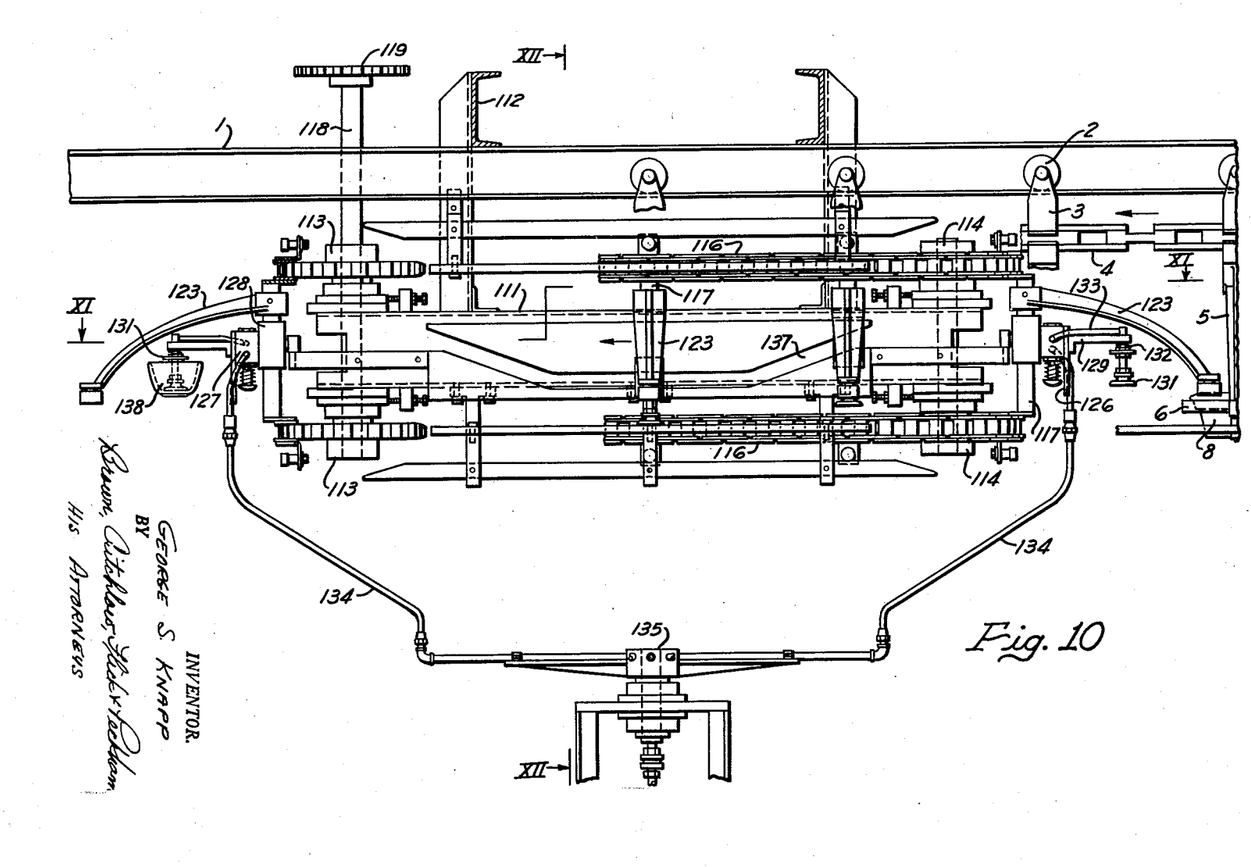
Fig. 10 is a side view of the stripper, partially broken away in a section.
Figure 11:
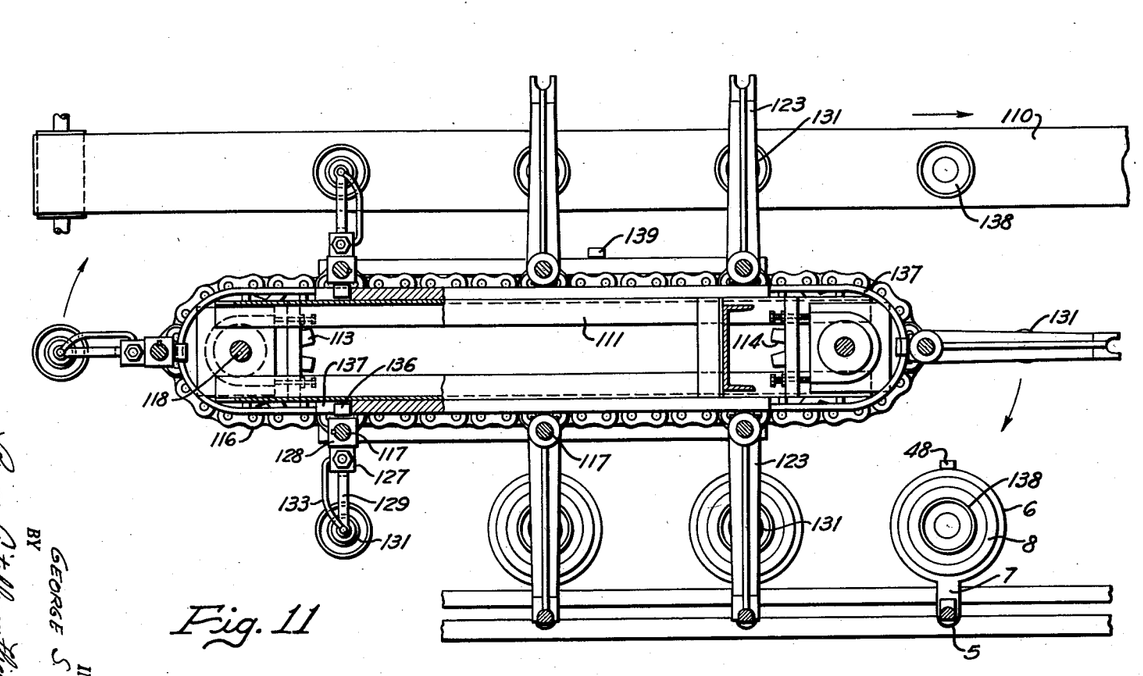
Fig. 11 is a horizontal section on line XI—XI of Fig. 10.

From the mold charger, the conveyor carries the mold to the automatic jigger C. Here the conveyor chain 4 passes around a large horizontal sprocket 66 and then on to the conveyor drive B. As shown in Fig. 5, the sprocket is rigidly mounted on the upper end portion of a large rotatable shaft 67, which is journaled at its upper end in the top of the jigger frame 66. The lower end of the shaft is journaled in the upper part of a stationary hollow cam drum 69 that is rigidly mounted on a central pedestal 70. Directly below the large sprocket, a circular plate 72 is rigidly mounted on the shaft. The bottom of this plate carries the jigger tools 73, of which there preferably are eight as indicated in Fig. 7. The plate is encircled by a depending skirt 74 that carries an outwardly projecting fork 75 beside each jigger tool for engaging a trolley arm 5 and holding it steady as the adjacent mold is carried around the shaft for a distance of 180°.

Figure 5A:
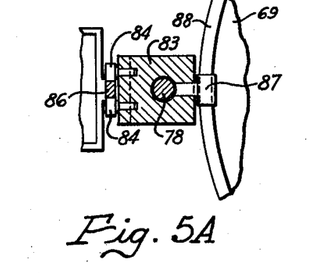
Fig. 5A is an enlarged fragmentary horizontal section taken on the line VA—VA of Fig. 5.

In order to raise the molds into operative relation with the jigger tools, there is a chuck 77 below each tool. These chucks are mounted on the upper ends of vertically movable posts 78 that extend down through bushings 79 in a table 80 rigidly mounted on the lower part of shaft 67 and rotatably supported by a circular track 81. Secured to each post below the top of the table are a pair of vertically spaced collars 82, between which there is a sleeve 83. The post is journaled in the sleeve. Projecting from the outer side of the sleeve is a laterally spaced pair of rollers 84 (Fig. 5A) that can move only up and down astraddle of a vertical guide 86 secured to the bottom part of the table. This arrangement permits the post to move up and down and yet rotate. The inner side of the sleeve is provided with a roller 87 that travels in a cam track 88 in the side of the hollow drum. This track is shaped to raise and lower the sleeves as they are carried around the drum by the table, whereby the posts and chucks are raised and lowered.

The lower part of each post 78 is splined in a pulley 90 that is rotatably supported by an arm 91 projecting downward from the bottom of the table. As the table is rotated by the central shaft 67, some of the pulleys are moved into and out of engagement with a continuously traveling endless belt 92 that is driven by a motor 93 at one side of the jigger machine, as shown in Fig. 9. The belt passes from the motor between a pair of sheaves 94 and then around other sheaves 95 which space the belt from half of the pulleys. As the table rotates and the chucks are moved up into engagement with the bottoms of the molds, the molds are lifted by them from the conveyor rings 6 and raised high enough for the jigger tools 73 to jigger the clay in the molds. At the same time, the raised chucks are rotated by the pulleys below them, which engage the belt 92. Then the molds are lowered into the rings and conveyed away from the jigger machine by the chain conveyor.

Figure 6:
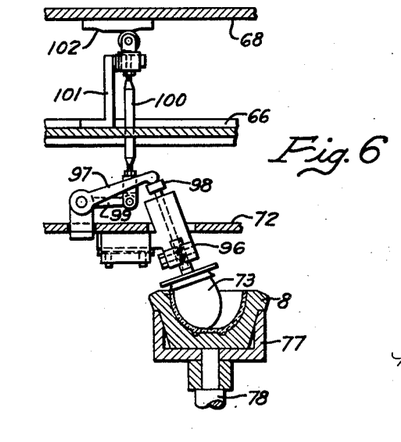
Fig. 6 is an enlarged side view of a jigger tool during jiggering.

Each of the jigger tools 73 is rotatably supported by a bracket 96 fastened to the bottom of plate 72 and also extending up through an opening in it, as shown in Fig. 6. Rockably mounted on the plate is an arm 97 that engages the top of a brake rod 98 slidably mounted in the bracket above the jigger tool. When the arm is pressed down against the brake rod, the lower end of the rod presses against the top of the tool and stops it from rotating. The arm is rocked by a lever 99 that is pivotally connected to the lower end of a rod 100, slidably mounted in sprocket 66 and a bracket 101 mounted thereon. The upper end of the rod carries a roller that engages a cam 102 on the lower surface of the top of the jigger frame. The roller strikes this cam just as the chuck starts to lower the mold with a jiggered cup in it. Engagement of the roller with the cam applies the brake to the jigger tool.

While the cup is being jiggered, oil is sprayed into the mold from a tube 104 projecting from a normally closed valve 105 carried below plate 72. The valve is connected by a pipe 106 with a suitable oil supply. The valve is opened by a plunger rod 107 slidably mounted in the plate and the sprocket above it. The upper end of the rod carries a roller 108 that is moved downward when it engages a cam 109 on the stationary frame above it.

From the jigger machine, the molds with the newly jiggered cups therein are conveyed through the drier E to dry the cups in the usual manner. The conveyor then carries the cups past stripper F, where they are removed from the molds and deposited on an endless conveyor belt 110 that conveys them to a suitable location for further operations, such as handle attaching. The stripper is similar in construction and operation to the mold charger. That is, certain elements travel in an endless path along beside the conveyor and lift the cups out of the molds and then, on the opposite side of the machine, deposit the cups on conveyor 110.

Like the mold charger frame 41, the frame 111 of the stripper is suspended from a pair of overhead beams 112 and has pairs of vertically spaced horizontal sprockets 113 and 114 at its front and rear ends. These sprockets are connected by upper and lower endless chains 116 which are connected at intervals by vertical shafts 117. The front pair of sprockets 113 is driven through a vertical shaft 118 from an upper sprocket 119, which in turn is driven by a chain 121 (Fig. 1) from a sprocket 122 turned by the shaft H that is rotated by the jigger shaft 67. The chains 116 travel at the same speed as the mold conveyor beside them. Rigidly mounted on the upper part of each shaft 117 is a long arm 123 that curves outward and downward to a forked end for engaging the lower part of a conveyor arm 5 to thereby hold the adjoining mold steady as it moves along beside the stripper. The roller 48 on the mold ring 6 is straddled by a vertical fork 126 depending from a valve 127 secured to a sleeve 128 splined on one of the shafts 117. Extending outward from each valve is an arm 129, in the outer end of which the hollow stem of a horizontal diaphragm 131 is slidably mounted. The diaphragm is pressed downward by a coil spring 132. There is a hole through the center of the diaphragm that is connected through its stem with a flexible tube 133 that leads to the adjoining valve. The valve is also connected by a hose 134 with a rotary distributor 135 that is connected with a vacuum pump (not shown). The distributor connects the pump with the hoses 134 only on the side of the stripper wherer the cups are picked up.

As the diaphragms are carried around the stripper, they move down and up at certain points. This movement is controlled by rollers 136 projecting from sleeves 128 and riding on a cam track 137. At the opposite sides of the stripper, the tracks are inclined down to horizontal lower levels. This causes the diaphragms to move down into the molds on the chain conveyor, and the timing is such that each diaphragm will be pressed down against the bottom of a cup 138 in one of the molds. As this occurs, the air pressure in the cup is reduced because the diaphragm is in communication with the vacuum pump. The diaphragm and cup then are raised by the inclined cam track and carried around to the opposite side of the stripper, where they again move down toward an endless conveyor belt 110 extending along the side of the stripper. When the cup is a short distance above the belt, the valve is tripped by passing over a fixed roller 139 to admit atmospheric pressure to the diaphragm so that the cup will be released from it and drop onto the belt. In this way, each mold is relieved of its cup, which then is deposited on the conveyor belt 110 for transportation to another location.

From the stripper, the conveyor A returns empty molds to the mold charger G to repeat the cup forming cycle that has just been described.

The modified jigger machine shown in Fig. 13 is essentially the same as the one previously described, except that the mold chucks are not rotated but the jigger tools are. Also, jiggering of plates is illustrated, although the same idea is likewise applicable to cups.

The center shaft 141 is rotated continuously by the conveyor chain (not shown) passing around a sprocket on the upper end of the shaft. Rigidly mounted on the shaft is a circular plate 142 that carries disc-like jigger tools 143. Each tool is inclined to the horizontal and is mounted on the lower end of an inclined shaft 144 journaled in a bearing 146 supported by the lower end of a vertical spindle 147. This spindle is journaled in a bearing 148 mounted on the plate, and is coaxial with the underlying chuck 149. Rigidly mounted on each vertical spindle is a horizontal pulley 150, while an endless belt 151 extends around all of these pulleys and also around a pulley 152 driven by an electric motor 153 supported by a bracket 154 on the table 155 that rotates with shaft 141. The jigger tools therefore are rotated continuously by the motor.

Each chuck 149 is mounted on the upper end of a vertically movable post 156 that extends down through the table and is supported by a roller 157 that rides on a stationary cam drum 158 to raise and lower the chuck. When a chuck is raised, it lifts a mold 159 from a conveyor ring 160 and raises it high enough for a rotating jigger tool to jigger the clay on the mold. Then the mold is lowered into the ring and carried away from the jigger machine by the chain conveyor to a drier.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A dinnerware mold charging machine for charging molds traveling past it continuously, comprising a continuously moving clay conveyor, means for depositing clay blanks on the conveyor, a pair of endless chains traveling in vertically spaced horizontal paths beside said conveyor, a plurality of vertical shafts connected at top and bottom to said chains at regularly spaced intervals, a slide mounted on each shaft and movable vertically thereon, an annular clay cutter carried by each slide laterally outside of said paths, a track positioned to be encircled by said slides as they are carried around it by the chains, means on the slides traveling along the track for supporting the slides, the track being shaped to move each successive slide first downward toward said conveyor to cause its cutter to cut a slug from an underlying clay blank and then upward with the slug in the cutter and later downward toward one of said traveling molds and then upward again, and means for delivering compressed air to each cutter above the slug therein for exerting force on the slug to deliver it to one of the molds below it.

2. A machine according to claim 1, in which each chain has portions traveling in straight lines in opposite directions, and said conveyor is located beside one of said straight line portions, whereby the opposite side of the machine can be placed beside a straight line mold conveyor.

3. A dinnerware mold charging machine for charging molds traveling past it continuously, comprising a continuously moving clay conveyor, means for depositing clay blanks on the conveyor, a pair of endless chains traveling in vertically spaced horizontal paths beside said conveyor, a plurality of vertical shafts connected at top and bottom to said chains at regularly spaced intervals, a slide mounted on each shaft and movable vertically thereon, an annular clay cutter carried by each slide laterally outside of said paths, a valve supported by each slide, means for operatively connecting each valve with the adjoining cutter and a source of suction, a track positioned to be encircled by said slides as they are carried around it by the chains, means on the slides traveling along the track for supporting the slides, the track being shaped to move each successive slide first downward toward said conveyor to cause its cutter to cut a slug from an underlying clay blank and then upward with the slug in the cutter and later downward toward one of said traveling molds and then upward again, said valves connecting said source of suction with the cutter over said conveyor to hold slugs in the cutters, and means engaged by the valves while they are over the traveling molds to admit air to said cutters whereby to eject slugs from the cutters.

4. A machine according to claim 1, in which said clay cutter has its clay engaging portion formed of a ring of tetrafluorethylene.

References Cited in the file of this patent

UNITED STATES PATENTS

| | | |
|---|---|---|
| 1,320,707 | Pauly | Nov. 4, 1919 |
| 1,440,716 | Bliss | Jan. 2, 1923 |
| 1,580,745 | McBride | Apr. 13, 1926 |
| 1,977,699 | Sebring | Oct. 23, 1934 |
| 2,091,767 | Miller | Aug. 31, 1937 |
| 2,230,778 | Flores | Feb. 4, 1941 |
| 2,334,640 | Miller | Nov. 16, 1943 |
| 2,374,553 | Miller | Apr. 24, 1945 |
| 2,409,999 | Miller | May 22, 1945 |
| 2,376,800 | Miller | Oct. 29, 1946 |
| 2,506,377 | Miller | May 2, 1950 |
| 2,548,303 | Gora | Apr. 10, 1951 |
| 2,548,304 | Gora | Apr. 10, 1951 |
| 2,611,493 | Nordquist | Sept. 23, 1952 |
| 2,629,160 | Briggs | Feb. 24, 1953 |
| 2,729,870 | Guthrie | Jan. 10, 1956 |

FOREIGN PATENTS

| | | |
|---|---|---|
| 364,181 | Great Britain | Jan. 7, 1932 |
| 388,645 | Great Britain | Mar. 2, 1933 |